Reissued Dec. 25, 1945

Re. 22,705

UNITED STATES PATENT OFFICE 22,705

PURIFICATION OF AZO DYESTUFFS

William W. Williams, Albany, N. Y., assignor to E. I. du Pont de Nemours & Company, Wilmington, Del., a corporation of Delaware No Drawing. Original No. 2,374,063, dated April 17, 1945, Serial No. 444,885, May 28, 1942. Application for reissue July 6, 1945, Serial No. 603,595

7 Claims. (Cl. 260—208)

This invention relates to the manufacture of black colors of superior characteristics, a particular element of superiority residing in this that they are substantially free of the red tone, which is caused by the compound $$\text{aniline} \xrightarrow{\text{alk.}} \text{H-acid}$$

which is formed during the reactions which produce the black color, and which heretofore could not be removed by any economical process.

The colors of the type which are described herein have four components which are azo coupled, but in general they have an underlying tone of red which detracts from their usefulness. It is an object of this invention to prepare such dyestuffs substantially free from underlying red tones.

The objects of the invention are accomplished, generally speaking, by preparing these colors and similar colors by a process which involves a step which is generally called acid finishing, the more precise nature of which is more fully set forth hereinafter.

The dyestuffs to which this invention relates have the same general formula in which benzidine and an amino-naphthol disulfonic acid are the interior components and a diazotized arylamine and an azo dyestuff coupling component are the exterior components. The dyestuffs are generally made by the process indicated by the formula $$\text{arylamine} \xrightarrow{\text{alk.}} \text{amino-naphthol-disulfonic acid} \xleftarrow{\text{acid}} \text{benzidine}$$

$$\xrightarrow{\text{alk.}} \text{coupling component}$$

in which the term, acid, refers to the coupling medium and "alk." means alkaline coupling medium. In this process the arylamines are any diazotizable primary arylamine, and the so-called coupling components are either arylamines or hydroxyaryl compounds. I prefer diazotizable primary arylamines of the formulae:

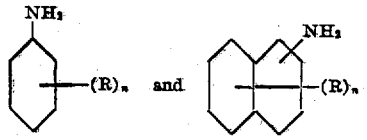

in which R is from a group consisting of hydrogen, alkyl containing from 1 to 2 carbon atoms, the corresponding alkoxy groups, chlorine, bromine, carboxyl and sulfonic, and $n$ is 1 to 3. I prefer coupling components of the formulae:

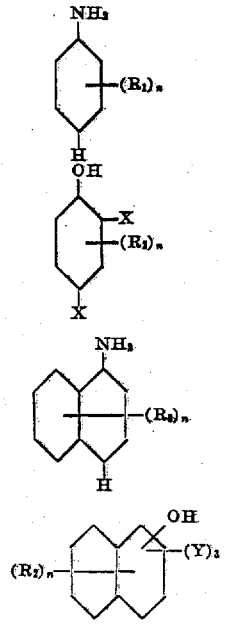

in which $R_1$ is from a group consisting of hydrogen, alkyl containing from 1 to 2 carbon atoms, the corresponding alkoxy groups, amino, mono- and dialkylamino containing from 1 to 2 carbon atoms, the corresponding hydroxy-alkylamino groups; one X is hydrogen and the other is $R_2$; $R_2$ is from a group consisting of $R_1$, hydroxyl, carboxyl and sulfonic; $R_3$ is from a group consisting of $R_1$, carboxyl and sulfonic; one Y is hydrogen and the others are $R_2$; and hydrogen must be ortho or para to the hydroxyl group. Examples of the arylamines are: xylidine, p-ethyl-aniline, toluidine, anisidine, p-butoxy-aniline, 2,5-dichloro-aniline, 2-methyl-5-bromo-aniline, anthranilic acid, sulfanilic acid, aniline-2,5-disulfonic acid, 2-chloro-4-nitro-aniline, p-nitro-aniline, p-amino-salicylic acid. Examples of the coupling components are: salicylic acid, phenol, resorcinol, aniline and its homologues, 2-amino-5-hydroxy-naphthalene-7-sulfonic acid, 2-amino-8-hydroxy-naphthalene-6-sulfonic acid, naphthionic acid, 2-hydroxy-naphthalene-6-sulfonic acid, cresidine, 2-hydroxy-naphthalene-3-carboxylic acid, and cresotinic acid.

In the process the dyestuff is first completed by standard methods and is then subjected to a treatment with hot acid. In general this hot acid treatment follows the completion of the dyestuff, but it is possible in certain cases to achieve the purpose of this invention by acid treatment prior to coupling to the final azo coupling component by utilization of the proper conditions of temperature, acidity and time of heating. In certain instances, when the acid treatment prior to the final coupling is employed, substances well-known to the prior art which stabilize the end diazonium groups to decomposition by heat may be introduced for preserving the diazonium groups during the hot acid treatment. Thus it is supposed that a small amount of a diazoamino compound may be formed as a by-product in the first or acid mono-coupling of the tetrazo of benzidine with 1-amino-8-naphthol-3,6-disulfonic acid and that this diazoamino compound may act as a coupling component in alkaline medium with the diazo of aniline. In a third coupling with phenylene diamine, the resulting compound could again couple in alkaline medium but the heating of either of these coupled compounds or the acidification thereof as in dyeing might split the resulting diazoamino compound forming as one product the monazo compound aniline →1-amino-8-naphthol-3,6-disulfonic acid which is a red compound. In this way, a diazoamino splitting may be in all and probably is in most cases involved in the acid treatment; and the acid treatment or mode of operation of the diazoamino splitting may vary slightly from case to case in pH, duration and temperature of heating, etc. The optimum conditions for a specific case may be found readily by one skilled in the art by preliminary tests.

In general I prefer to remove the impurity from the main body of the dyestuff by physical means which is exemplified in the examples. The nature of the wash used may be varied between wide limits. In general, the higher the electrolyte content of the wash solution, the more rapid the washing, but the less soluble the arylamine→1-amino-8-naphthol-3,6-disulfonic acid in the wash solution. Electrolytes such as acids and salts may be employed with success. The optimum composition of the wash solution is determined by the specific product being washed.

The following examples illustrate the invention but are not limitative thereof:

*Example I*

A 0.1 mole charge of C. I. No. 581 was prepared in the customary manner which comprises mono-coupling the tetrazo of benzidine with 1-amino-8-naphthol-3,6-disulfonic acid, then mono-coupling the resulting monazo diazo compound in alkaline medium with the diazo of aniline, and finally coupling the resulting disazo diazo compound in alkaline medium with meta phenylene diamine. After the final coupling to m-phenylene-diamine was complete, 0.3 mole of $H_2SO_4$ was slowly added in order to make the reaction mixture distinctly acid to Congo red paper. The suspension was heated with stirring to about 95° C., and held at that temperature for about fifteen minutes. During the heating, but not appreciably prior to the attaining of a temperature of 60° C., a soluble red dye was observed in the bleed-out from a drop of the reaction mixture placed on filter paper. The reaction mixture was filtered at the elevated temperature, and the press cake was washed practically free from the red impurity with water which was made slightly acid to Congo red paper with a small amount of sulfuric acid. The wash water was kept at a temperature near its boiling point. The washed press cake was made slightly alkaline to Brilliant yellow paper by triturating with a portion of a solution of sodium carbonate made by dissolving 40 parts of sodium carbonate in 75 parts of water. The alkalized press cake was dried and standardized in the usual manner with salt and sodium carbonate.

The product dyed leather with practically no red bleed-in in contradistinction to leather dyed with C. I. No. 581 made according to the methods of the prior art.

When the product was dyed on mixed cotton and wool fabrics, the wool dyeing had much less of an undesirable reddish shade than did a similar dyeing of C. I. No. 581 made according to the methods of the prior art.

The product was further superior to C. I.. No. 581 which was prepared by methods of the prior art, i. e., which was isolated after completion of the final coupling to m-phenylene-diamine without acidifying, heating above 60° C. and washing, in that filtrates from the dyeing of paper with this product contained much less red. When, as in certain processes, the same exhausted dye bath liquors are used over and over again for a series of dyeings, using C. I. No. 581 made by the methods of the prior art, the red impurity will build up to a concentration such that the dyeings made late in the series are dyed in inacceptable shades.

*Example II*

A dye made exactly as that described in Example I, with the exception that m-toluylene-diamine was substituted for the m-phenylene-diamine, had dyeing properties essentially the same as those of the product of Example I, with the exception that the shade produced was a redder black.

*Example III*

A dye made exactly as that described in Example I with the exception that the final coupling was made to a slurry of a mixture of 1,6- and 1,7-naphthylamine sulfonic acids. This product produced blue-shade black dyeings on cotton, and produced a much weaker red capillary than did a similar preparation made without the use of the acid-finishing when tested for red impurity as follows:

About one-half part of crude dye was dissolved in 100 parts of boiling water. One part of glacial acetic acid was added, followed by 2 parts of 37% hydrochloric acid. The suspension was again brought to the boil, and a strip of filter paper was suspended in the liquor for 5 minutes at a temperature above 80° C. The capillary was compared with a similar one prepared from standard color.

The colors produced by this process have great advantages over the corresponding colors produced by the methods of the prior art. They are in a few state of purity; there is no red bleed in when they are applied to leather; and they do not build up a concentration of red as dye baths are exhausted.

The splitting of the diazoamino linkage may be accomplished by sulfuric acid or by heating in the presence of any hydrogen ion from a source compatible with the reaction mixture. Sulfuric, hydrochloric, acetic, and phosphoric acids have all been successfully employed and are exemplary of the class of acids.

The diazoamino linkage may be split at any time subsequent to its formation. The optimum time is generally after completion of the coupling to the final azo coupling component since at this time there are no diazonium groups attached to the main body of the dyestuff, which groups might tend to decompose under certain conditions of temperature and acidity.

The theory may be postulated that during the coupling of benzidine to H-acid under the acid conditions used in the prior art, a few percent of a diazoamino isomer forms. This $$C—NH—N=N—C$$

linkage is much less stable than the $$C—N=N—C$$

linkage. The splitting of the diazoamino linkage by the application of heat in the presence of hydrogen ions at any time prior to the second coupling results in the formation of free 1-amino-8-naphthol-3,6-disulfonic acid which, unless removed prior to the second coupling, is subject to coupling with the diazotized arylamine, thus producing the undesired reddish impurity. The splitting of the diazoamino linkage at any time subsequent to the second coupling would also result directly in the formation of the undesired impurity. However, the applicant does not wish to be bound by this theory since other causes may be found to be the primary ones.

As many apparently widely different embodiments of this invention may be made without departing from the spirit and scope thereof, it is to be understood that I do not limit myself to the specific embodiments thereof except as defined in the appended claims.

I claim:

1. In the manufacture of trisazo dyestuffs in which an interior monazo component consisting of tetrazotized benzidine mono-coupled in acid medium with an amino-naphthol-disulfonate is thereafter coupled in alkaline medium with the diazo of an arylamine and with an azo dye coupling component of a group consisting of arylamines and hydroxy aryl compounds, the method of removing supervenient constituents which comprises making a suspension of an azo compound thus formed in a water solution in which the hydrogen ion concentration is sufficient to show distinct acidity to Congo red paper, heating at about 93°–97° C. until the supervenient material is extracted from the azo compound, and then filtering for isolating the azo compound, said solution being acidified with an acid of the group consisting of sulfuric, hydrochloric, acetic and phosphoric.

2. In the manufacture of a trisazo dyestuff which is represented by the formula $$\text{arylamine} \xrightarrow[(2)]{} \text{1-amino-8-naphthol-3,6-disulfonic acid} \xleftarrow[(1)]{}$$
$$\text{benzidine} \xrightarrow[(3)]{} \text{coupling component}$$

wherein the first coupling (1) is made in acid medium and the subsequent couplings are made in alkaline medium, the step which comprises treating the trisazo compound in an acidified water solution in which the hydrogen ion concentration is sufficient to show distinct acidity to Congo red paper, heating the compound in suspension in said solution at about 93°–97° C. until supervenient compounds are extracted, and then filtering, said solution being acidified with an acid of the group consisting of sulfuric, hydrochloric, acetic and phosphoric.

3. The process in accordance with claim 2 in which the dye is suspended in the reaction medium resulting from the last coupling and said medium is acidified.

4. The process in accordance with claim 2 in which the acid is sulfuric acid.

5. In the manufacture of the dyestuff aniline→1-amino-8-naphthol - 3,6 - disulfonic acid←benzidine→meta-phenylene diamine wherein the tetrazo of benzidine is first mono-coupled to 1-amino-8-naphthol-3,6-disulfonic acid in acid medium and the subsequent couplings are made in alkaline medium, the step which comprises adding sulfuric acid to the suspension resulting from the final coupling until it is distinctly acid to Congo red paper, heating at about 93°–97° C. until supervenient material is extracted, and then filtering.

6. In the manufacture of the dyestuff aniline→1-amino-8-naphthol - 3,6 - disulfonic acid←benzidine→meta-toluylene diamine wherein the tetrazo of benzidine is first mono-coupled to 1-amino-8-naphthol-3,6-disulfonic acid in acid medium and the subsequent couplings are made in alkaline medium, the step which comprises adding sulfuric acid to the suspension resulting from the final coupling until it is distinctly acid to Congo red paper, heating at about 93°–97° C. until supervenient material is extracted, and then filtering.

7. In the manufacture of the dyestuff aniline→1-amino-8-naphthol - 3,6 - disulfonic acid←benzidine→Cleves acid, wherein the tetrazo of benzidine is first mono-coupled to 1-amino-8-naphthol-3,6-disulfonic acid in acid medium and the subsequent couplings are made in alkaline medium, the step which comprises adding sulfuric acid to the suspension resulting from the final coupling until it is distinctly acid to Congo red paper, heating at about 93°–97° C. until supervenient material is extracted, and then filtering.

WILLIAM W. WILLIAMS.